United States Patent [19]

Boyle et al.

[11] Patent Number: 5,573,225
[45] Date of Patent: Nov. 12, 1996

[54] MEANS FOR PLACING CABLE WITHIN COILED TUBING

[75] Inventors: Bruce W. Boyle, Sugar Land; Laurent E. Muller, Stafford, both of Tex.

[73] Assignee: Dowell, a division of Schlumberger Technology Corporation, Houston, Tex.

[21] Appl. No.: 239,198

[22] Filed: May 6, 1994

[51] Int. Cl.⁶ .................................................. B66F 3/24
[52] U.S. Cl. ..................................................... 254/134.4
[58] Field of Search .................. 254/1, 134.4, 134.3 FT, 254/134.3 R; 15/109.06 R; 268/25, 43, 178

[56] References Cited

U.S. PATENT DOCUMENTS

| | | | |
|---|---|---|---|
| 3,778,878 | 12/1973 | El Bindari | 254/134.4 |
| 5,022,634 | 6/1991 | Keeble | 254/134.4 |
| 5,199,689 | 4/1993 | Proud et al. | 254/134.4 |
| 5,211,377 | 5/1993 | Griffioen et al. | 254/134.4 |
| 5,311,952 | 5/1994 | Eddison et al. | 175/61 |
| 5,429,194 | 7/1995 | Nice . | |

FOREIGN PATENT DOCUMENTS 0 565 287 A1  10/1993  European Pat. Off. .
2 122 367   1/1984  United Kingdom .

OTHER PUBLICATIONS

Brochure " Whipstocks provide an effective cost efficient method of sidetracking in either cased or open hole" copyright 1993. Weatherford.

*Primary Examiner*—Robert C. Watson
*Attorney, Agent, or Firm*—John E. Vick, Jr.

[57] ABSTRACT

A cable is injected into a length of coiled tubing disposed on a reel by an apparatus and method which includes attaching a small diameter pipe to the end of the coiled tubing, feeding the cable into the opposite end of the pipe through a seal and pumping a liquid into the annular space defined by the cable and the pipe at sufficient pressure and flow rate so that fluid drag on the cable overcomes the frictional force of the cable passing through the seal to inject the cable through the entire length of the coiled tubing. This method avoids the prior expensive practice of deploying coiled tubing in a straight line, either horizontally or vertically in order to feed cable through the tubing.

16 Claims, 1 Drawing Sheet

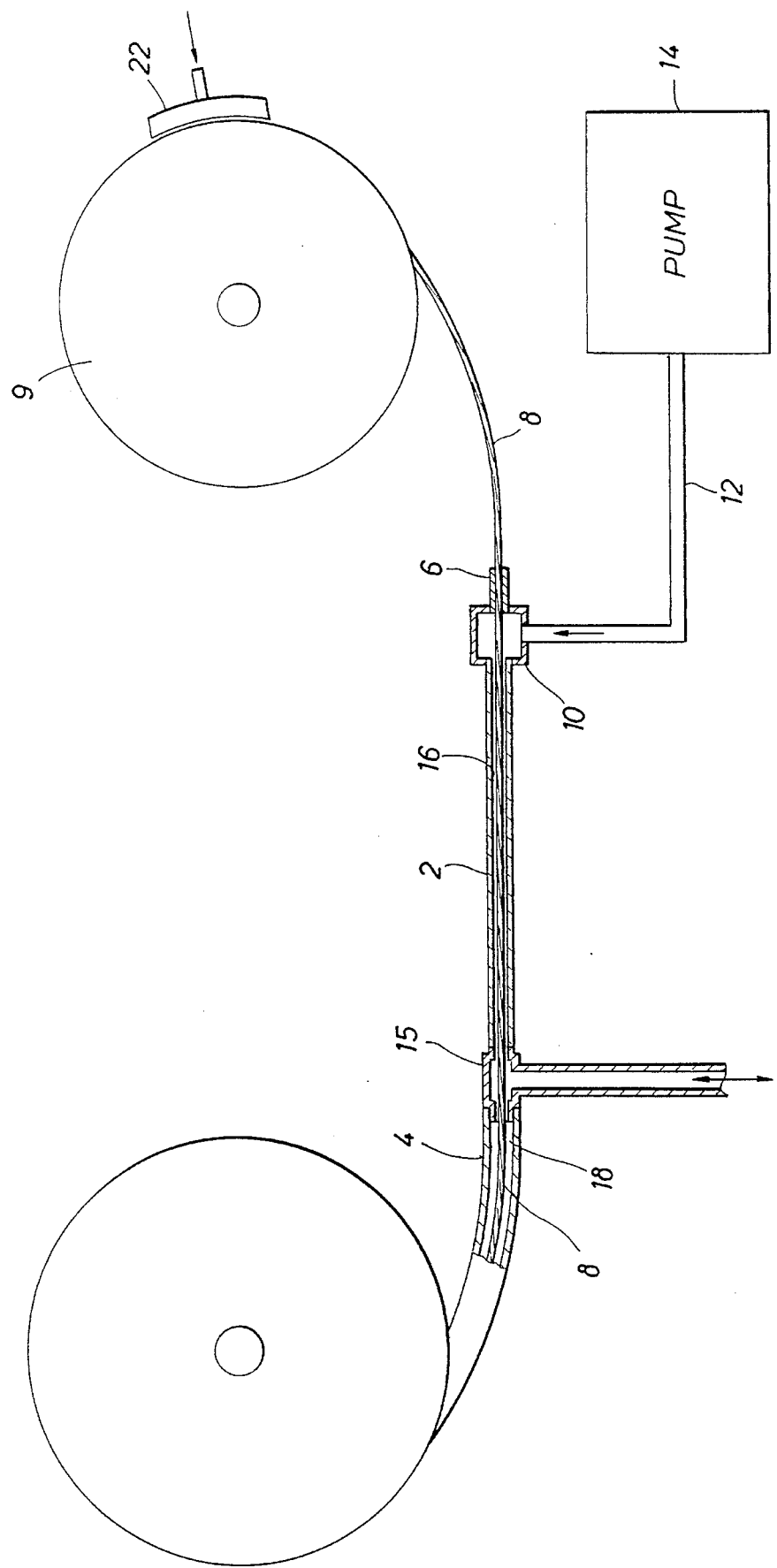

MEANS FOR PLACING CABLE WITHIN COILED TUBING

This invention relates to the art of subterranean well operations, and more particularly, to a means and method for installing a cable within coiled tubing for the purposes of conducting well treatments in conjunction with wireline-operated tools.

BACKGROUND OF THE INVENTION

Coiled tubing has long been used in well operations in order to place desirable fluids such as acids, cement and the like in a well utilizing a relatively simple apparatus comprising a long length of tubing, often as long as 25,000 feet, wound onto a large spool or reel. In coiled tubing operations, tubing from the reel is fed into the wellbore utilizing an injector mechanism which is well known in the art. Fluids can be fed through a fitting on the tubing reel, through the tubing to a tool disposed on the inserted end of the coiled tubing within the well.

In recent years, it has become desirable to place electrically operated tools in the wellbore either alone or in combination with fluid treatment tools. For instance, logging operations can be conducted on coiled tubing which may also include means for injecting nitrogen gas into the wellbore in order to gauge flow. It is also advantageous to use coiled tubing to convey a logging tool within a highly deviated or horizontal wellbore where gravity wireline operations cannot be used to convey the logging tool to the appropriate wellbore location.

More recently, coiled tubing has been used in conjunction with a fluid operated downhole drilling motor to conduct slim hole drilling in vertical, deviated and horizontal directions. With such coiled tubing drilling operations, it is often desirable to have a device capable of sensing the direction of drilling and communicating this and other data to the operator on the surface so that alterations may be made to the direction of the drilling during the drilling process. It can be clearly seen that in order to employ logging tools as well as to operate steering sensors or tools in coiled tubing drilling operations, it is necessary to provide electrical communication between such tools and the surface through a cable disposed within the coiled tubing.

In the past, in order to install electrically conductive cable within coiled tubing, it has been necessary to deploy the coiled tubing in a relatively straight line such as deploying it into a vertical well or laying the coiled tubing horizontally such as on a straight road bed in order to feed the electrically conductive cable into the tubing. It is obvious that this is a time consuming, expensive and labor intensive solution to the problem of installing cable within tubing. In fact, the cost of installation in this manner often exceeds the cost of the cable itself by three to five times. Because of the high cost of cable installation, it has become economically necessary to maintain coiled tubing reels with cable installed dedicated to that use for the life of the reel. This is both expensive and wasteful of costly assets requiring either a large inventory of dedicated, cable-installed reels to be kept at widely spaced locations or only a few such dedicated reels which must be transported over long distances for use.

It is well known in the industry that it is theoretically possible to pump cable through coiled tubing while it is on the reel. The fluid friction drag force of the flowing fluid pulls the cable, overcoming friction forces between the cable and the coiled tubing. However, attempts to pump cable into coiled tubing on the reel have been thwarted by the cable tension induced by the cable seal through which the cable must be passed into the tubing. This cable tension generates a large frictional force as the cable is pulled tight within the tubing around the reel creating a capstan effect which prevents the cable from passing through the entire length of tubing on the reel.

A mechanical means to overcome the friction and pressure differential of the cable seal was disclosed in European patent application publication number 0565287A1. A mechanical pulling device is located within a sealed chamber connected to the coiled tubing and with the cable passing into the chamber through a seal. When used in conjunction with a fluid pump, cable can be injected into coiled tubing on the reel because the pulling device overcomes the friction of pulling the cable through the seal thereby avoiding the capstan effect, albeit with considerable mechanical complexity.

SUMMARY OF THE INVENTION

The present invention provides a means and method for pumping cable into coiled tubing which does not use a mechanical device to pull the cable through a seal.

In accordance with the invention, a method for installing cable having a first diameter into a first tube having a larger first internal diameter comprises providing a seal through which the cable passes attached to a second tube having a second internal diameter which is at least larger than the diameter of the cable. The second tube is coupled to the open end of the first tubing and fluid is pumped from pump means through a fluid connection in the second tube, within an annular space between the cable and the second tube and into the first tube. The flow rate in the second tube is maintained at a rate sufficient to overcome the frictional drag of the cable through the seal and the differential pressure across the seal. The flow rate in the first tube is maintained at a rate to cause the cable to be pumped into the first tube by fluid drag on the cable.

Further in accordance with the invention, an apparatus for installing cable into a first tube comprises a second tube and a flow controlling connector between the first and second tubes; a seal at an end of the second tube remote from the connector and a fluid coupling on the second tube connected to a fluid pump for pumping fluid into the second tube at a first pump rate and into the first tube at a second pump rate differing from the first pump rate whereby frictional force on the external surface of the cable causes the cable to be transported through the seal, the second tube and the first tube.

Further in accordance with the invention, an apparatus for installing cable having a first diameter into coiled tubing having a first internal diameter comprises a reel of coiled tubing having coupled thereto a length of small diameter tubing having second internal diameter larger than the diameter of the cable to be installed and smaller than the first internal diameter. A seal is provided at the end of the small diameter tubing remote from the coiled tubing coupling and a pump coupling is provided on the small diameter tubing to which a pump is connected for pumping fluid into the small diameter tubing and the coiled tubing whereby frictional force on the external surface of the cable causes the cable to be transported through the seal, the small diameter tubing and the coiled tubing.

It is therefore an object of this invention to provide a simple, transportable means and method whereby cable may be easily installed within tubing.

It is another object of this invention to provide a means and method whereby cable may be easily and inexpensively installed and removed from a reel of coiled tubing so that maximum use of both the cable and the coiled tubing may be realized.

A BRIEF DESCRIPTION OF THE DRAWINGS

These and other objects of the invention are accomplished through the manner and form of the present invention to be described hereinafter in conjunction with the accompanying drawing illustrating a preferred embodiment of the invention and in which the sole drawing FIGURE is a schematic cross-sectional view of a cable injector apparatus for installing cable within coiled tubing in accordance with a preferred embodiment of the present invention.

DETAILED DESCRIPTION OF PREFERRED EMBODIMENTS AND THE DRAWING

A drag force against the outside surface of a cable by flowing fluid can be used to advantage to first overcome a frictional force exerted on a cable by a seal through which it passes and second, to cause the cable to flow through a long length of tubing.

The drag force per unit length of cable can be approximated by equation 1, below:

$$\frac{F_o}{L} = \tau \pi D \qquad \text{Equation 1:}$$

where $F_o$ is the drag force

L is exposed length in feet

D is the outside diameter of the cable in feet, and $\tau$ is the average wall shear stress calculated by the formula of equation 2, below:

$$\tau = \lambda \frac{\rho}{2g} V^2 \qquad \text{Equation 2:}$$

where $\rho$ is the fluid density

V is the fluid velocity in ft/sec g is the gravitational constant (32.2 ft/sec$^2$) and $\lambda$ is a dimensionless friction coefficient derived from the Darch-Weisbach equation and the empirical Colebrook equation developed for pipe flow.

In accordance with one aspect of the present invention, a cable is passed through a seal into a tube having a coupling in fluid communication with a fluid pump. Fluid is then pumped into the tube at a rate sufficient to cause a drag force on the cable sufficient to at least equal or overcome a frictional force exerted on the cable by the seal and the differential pressure on the cable which would tend to force it back through the seal. Sufficient drag force thus causes the cable to move axially within the tube toward the end remote from the seal. In accordance with the above equations, several combinations of tube length, diameter and fluid flow rate can be chosen to provide sufficient drag force on the cable.

In accordance with another aspect of the present invention, the tube, above is coupled to another tube of longer length for installation of the cable therewithin. The interconnection between the tube described above and the longer tube must provide control for the fluid flow rate within the longer tube which flow rate may be determined, as above. Thus, a coupling is provided between the injection tube and the longer tube which effects the desired change in flow rate between the two tubes. In its simplest and most preferred form, the coupling may comprise a differential pipe diameter coupling but the coupling may comprise a choke, provide for fluid bleed-off or any other means whereby a flow rate differential may be effected between the injection tube and the longer tube.

While installation of cable into coiled tubing is the primary desirable feature of the present invention, flexibility in coiled tubing use is also desirable. If it is desired to remove the cable from the tubing, it is possible to remove the cable by reversing the flow of fluid within the same system described above. In this regard, it has been found that it is desirable to maintain some drag force on the cable as it exits the tubing while maintaining the cable in tension once it has exited the longer tubing.

Referring now to the drawings wherein the showings are for the purpose of illustrating a preferred embodiment of the invention only and not for the purpose of limiting same, the FIGURE illustrates an apparatus which uses fluid flow to pump a cable into the coiled tubing, but avoids the use of a mechanical device to pull the cable through the seal. Instead, a relatively short piece of straight pipe or tubing 2, such as 20–400 feet of high pressure pipe having an internal diameter (I.D.) of ½" to ¾" in the preferred embodiment, is connected at one end to and in fluid communication with a reel of coiled tubing 4 using, again in the preferred embodiment, a "tee" flow rate controlling coupling 15. A cable seal 6 is provided at the opposite end of the pipe 2. A cable 8 is coiled on a reel 9 and passed through the cable seal 6 and through the entire length of the pipe 2 into the coiled tubing 4. It will be understood by those skilled in the art that the cable seal 6 causes some frictional drag on the cable 8 but that, in accordance with the present invention, frictional drag on the cable within the seal is kept to a minimum. One preferred form of cable seal is a common wireline lubricator known to those skilled in the art.

The pipe 2 also includes a fluid coupling 10 connected through a fluid conduit 12 to a high pressure pump 14 which supplies fluid at high pressure to the annular volume 16 between the inside of the pipe 2 and the cable 8 as well as in the annular volume 18 between the cable 8 and the inner wall of the coiled tubing 4. The fluid friction drag in the pipe/cable annulus 16 provides the necessary cable tension to overcome the friction and pressure differential in the cable seal 6. Therefore, the cable 8 has virtually no tension as it enters the reel of coiled tubing 4 and it is free to be pumped through the tubing coils using the fluid flow drag on the cable 8 within the cable/coiled tubing annulus 18.

To install a cable 8, the equipment is set up as shown in FIG. 1. The pipe 2 must have an internal diameter at least larger than the cable 8, capable of withstanding the pumping pressure, and be reasonably straight to avoid excessive wall friction. Theoretically, almost any fluid could be used to inject the cable into the coiled tubing, although water is the most practical choice.

The cable 8 is hand fed from the reel 9 through the seal 6 and the short, straight pipe 2 so that the cable 8 extends a few feet inside the coiled tubing 4. Fluid is then pumped through the pipe 2 and the coiled tubing 4. A small back tension is preferably maintained on the cable 8, such as by dragging a brake 22 on the reel 9 to control the installation rate. Sensors (not shown) may be used to measure the length of cable inserted, as well as the tension and speed. However, it may only be necessary to detect the arrival of the cable at the hub end of the coiled tubing, then measure (by hand) the length of slack to be inserted. Fluid pressure(s) and flow rate(s) are monitored with sensors and/or controlled by the pump 14.

In the preferred embodiment, the injection fluid flows through the short pipe 2 and the coiled tubing 4 in series. In order to have two different flow rates in the short pipe 2 and the coiled tubing 4 a flow rate controlling coupling must be provided. In the preferred embodiment, the different flow rates are obtained by inserting a flow rate controlling coupling such as the "tee" shaped connector 15 between the pipe 2 and the tubing 4 as shown in the drawing. As used in this specification the term flow rate controlling coupling will be understood to mean any device which serves to divert or add fluid in order to make up the difference between the flow rates in the first pipe and the second pipe. The tee connection 15 is preferred. The branch of the tee may be connected to a flow restrictor (orifice or choke) in the case of flow diversion (flow in pipe 2 greater than in the tubing 4). If flow is to be added (flow in the tubing 4 greater than the flow in the pipe 2) the tee may be connected to a second pump (not shown) or to the first pump 14 by means of a flow divider. Other flow controlling couplings will be apparent to those skilled in the art.

EXAMPLES

An injection test was performed using 10,000 feet of 1–22 monocable having a diameter of ¼", 71.5 feet of ½" Schedule 80 steel pipe 2 and about 9900 feet of coiled tubing 4. The cable tension was measured after it was installed in the ½' pipe but before it entered the coiled tubing. A flow rate of 1.2 barrels per minute (bbl/min) generated a cable tension of 55 lb. and a pressure of 3300 psi (1600 psi across the ½" pipe). At a pump rate of 1.4 bbl/min., the cable was pumped into the coiled tubing.

Table 1 shows the predicted performance of a system designed to install 1–23 monocable in a coiled tubing reel with 15000 feet of 1.5"×0.109" coiled tubing.

TABLE I

| Inputs | Small Pipe | Coiled Tubing |
| --- | --- | --- |
| Flow Rate (GPM) | 50 | 50.00 |
| Length of Coiled Tubing |  | 15000 |
| Tube ID | 0.532 | 1.282 |
| Cable OD | 0.22 | 0.22 |
| Pressure at CT Outlet |  | 0 |
| Drag Force in cable seal | 20 |  |
| Cable Fluid Friction factor | 0.01559743 | 0.01759474 |
| Pipe Fluid friction factor | 0.01529887 | 0.02409194 |
| Cable roughness error (%) | 0% | 0% |
| Pipe roughness error (%) | 0% | 0% |
| Flow Area (in^2) | 0.18 | 1.25 |
| Fluid Velocity (ft/sec) | 87.05 | 12.80 |
| Fluid Kinetic Viscosity (ft^2/sec) | 1.00E−05 | 1.00E−05 |
| Fluid Density (slugs/ft^3) | 1.93 | 1.93 |
| Hydraulic Radius (in) | 0.078 | 0.2655 |
| Reynold's Number | 2.26E+95 | 1,13E+05 |
| HFLOW (lb/ft^2) | 7302 | 158 |
| HFLOW (psi) | 50.71 | 1.10 |
| Cable roughness (ft) | 1.00E−06 | 1.00E−06 |
| Pipe roughness (ft) | 1.00E−07 | 1.50E−04 |
| Cable roughness (4* hydr radius) | 0.00004 | 0.00001 |
| Pipe roughness (4* hydr radius) | 0.00000038 | 0.00169 |
| Fluid drag (lb/ft) | 1.6399 | 0.0400 |
| Friction pressure drop (psi/foot) | 30.01 | 0.29 |
| Curved pipe press drop (psi/rad) |  | 0.0489 |
| Avg coil diam (ft) |  | 7.5 |
| Curved pipe press drop (psi/ft) |  | 0.0130 |
| Expansion press drop coeff [K] | 0.83 |  |
| Pressure drop: small pipe to CT |  | 42.33 |
| Pressure diff. pushing cable out psi |  | 4540.59 |
| Force pushing cable out (lb) | 172.60 |  |

TABLE I-continued

| Inputs | Small Pipe | Coiled Tubing |
| --- | --- | --- |
| Length of small pipe req'd (ft) | 117.45 | Assume: 120.00 |
| Pressure Drop in CT reel (psi) | 4498.25 |  |
| Inlet pressure from pump (psi) | 8065 | 8141 |
| drag force in seal + back tension) (lb) |  | 24.18 |
| Pressure drop in small pipe (psi) | 3524 | 361 |
| Tension due to small tube drag (lb) | 192.60 | 196.79 |

Compared to the current installation methods (coiled tubing laid out flat on the ground or hung in a vertical well), the fluid cable injection system of this invention is much less expensive and logistically simpler. The simplicity of the method allows it to be used at almost any field location, greatly enhancing the flexibility of coiled tubing logging operations and reducing the cost of the coiled tubing logging service. New services, using downhole sensors and actuators, will become more economically viable.

There are several advantages of the fluid cable injection system over a mechanical injection system wherein cable tension through the seal is overcome by a mechanical pulling or pushing mechanism. With no moving parts, it is much easier and less expensive to develop and manufacture. Also, the installation process is safer and easier to control than with the mechanical system. The forces applied to the cable are low, so the potential for damaging the cable during the installation process is quite low compared with a mechanical pulling device. There is no need for a source of power other than the fluid pump.

The above examples have illustrated the use of a fluid which comprises water. It will be understood by those skilled in the art that the term "fluid" as used in this specification may include either a liquid or a gas. Useful gasses may include, for example, nitrogen or air. Similarly, useful liquids may include water, sea water, brine, polymer viscosified water, any hydrocarbon liquid or an aqueous or hydrocarbon liquid to which a flow-improvement additive of types well known in the art has been added.

While the invention has been described in the more limited aspects of preferred embodiments thereof, other embodiments have been suggested and still others will occur to those skilled in the art upon a reading and understanding of the foregoing specification. It is intended that all such embodiments be included within the scope of the present invention as limited only by the appended claims.

Having thus described my invention, I claim:

1. Apparatus adapted for use in connection with wellbore operations, comprising:

means for installing an electrical cable having a first diameter into one end of a coiled tubing adapted to be disposed in a wellbore, the coiled tubing having a first internal diameter which is larger than the first diameter of the cable, the means for installing including, a wireline lubricator including a seal through which the cable passes, a small diameter pipe attached to the wireline lubricator having a second internal diameter which is at least larger than the first diameter of the cable and smaller than the first internal diameter of the coiled tubing, the small diameter pipe including a fluid coupling, a further coupling connecting said small diameter pipe to said one end of said coiled tubing, said further coupling being in fluid communication with said one end of said coiled tubing, and a pump connected to said fluid coupling of said small diameter pipe and in fluid communication with said small diameter pipe via said fluid coupling, said fluid coupling providing a fluid communication between said pump and a first annular space between the cable and the small diameter pipe and between said first annular space and a second annular space between the cable and the coiled tubing: and a wellbore apparatus adapted to be mechanically connected to said coiled tubing and adapted to be electrically connected to said electrical cable when said electrical cable has been installed into said coiled tubing by the means for installing.

2. Apparatus as set forth in claim 1 wherein the cable is wound on a spool.

3. Apparatus as set forth in claim 2 wherein the spool includes a brake.

4. An apparatus adapted for use in connection with wellbore operations in a wellbore, comprising:

a first coiled tubing adapted to be disposed in a wellbore;

means for installing a cable into one end of said first coiled tubing, the means for installing comprising, a second tube, a flow controlling connector interconnected between the first coiled tubing and the second tube, a seal at an end of the second tube remote from the flow controlling connector, and a fluid coupling on the second tube connected to a fluid pump for receiving a fluid from the fluid pump and pumping the received fluid into the second tube at a first pump rate, the flow controlling connector pumping the fluid from the second tube into the first coiled tubing at a second pump rate, whereby a frictional force mated by said fluid acting on the external surface of the cable in said second tube causes the cable to be transported through the seal, through the second tube and into the first coiled tubing; and a wellbore apparatus adapted to be connected to said first coiled tubing and to said cable when said cable has been installed into said first coiled tubing by the means for installing.

5. Apparatus as set forth in claim 4 wherein the cable is wound on a spool.

6. Apparatus as set forth in claim 5 wherein the spool includes a brake.

7. Wellbore apparatus adapted for use in connection with operations in a wellbore, comprising:

a coiled tubing adapted to be disposed in said wellbore;

means interconnected between a cable and an end of said coiled tubing for inserting said cable into said coiled tubing, the means for inserting including, receiving means for receiving said cable, a pipe having a first end connected to said receiving means and a second end adapted to be connected to said coiled tubing, said cable from said receiving means adapted to be disposed within said pipe and adapted to be received in said coiled tubing, said cable and an internal wall of said pipe defining an annular volume when said cable is disposed within said pipe, said pipe having a length and a diameter, and pumping means for pumping a fluid into said annular volume of said pipe and into said coiled tubing, an actual fluid drag force being exerted by said fluid on said cable in said annular volume of said pipe when said pumping means pumps said fluid into said annular volume of said pipe, a threshold drag force of said fluid on said cable in said annular volume being required to push said cable through said pipe and into said coiled tubing, said length and said diameter of said pipe being selected such that said actual fluid drag force of said fluid on said cable in said annular volume is greater than or equal to said threshold drag force, said cable being inserted into said coiled tubing when said actual fluid drag force of said fluid on said cable is greater than or equal to said threshold drag force.

8. The wellbore apparatus of claim 7, wherein a flow rate of said fluid and a pressure drop exists in said coiled tubing, said threshold drag force is a function of said flow rate and said pressure drop in said coiled tubing, said length and said diameter of said pipe is a function of said threshold drag force, said actual fluid drag force of said fluid on said cable in said annular volume is a function of said length and said diameter of said pipe, and said actual fluid drag force is greater than or equal to said threshold drag force when said length and said diameter of said pipe is carefully selected.

9. The wellbore apparatus of claim 8, wherein said pipe has a first diameter, said coiled tubing having a second diameter, said first diameter of said pipe being less than said second diameter of said coiled tubing.

10. The wellbore apparatus of claim 9, further comprising a flow rate controlling coupling interconnected between said second end of said pipe and said coiled tubing adapted for changing said flow rate of said fluid in said coiled tubing.

11. The wellbore apparatus of claim 7, wherein said cable comprises an electrical communication cable.

12. Wellbore apparatus adapted for use in connection with wellbore operations, comprising:

means for installing a cable having a first diameter into one end of a coiled tubing, said coiled tubing being adapted to be disposed in a wellbore, the coiled tubing having a first internal diameter which is larger than the first diameter of the cable, the means for installing including, a seal through which the cable passes, a small diameter pipe attached to the seal having a second internal diameter which is at least larger than the first diameter of the cable and smaller than the first internal diameter of the coiled tubing, the small diameter pipe including a fluid coupling, a further coupling connecting said small diameter pipe to said one end of said coiled tubing, said further coupling being in fluid communication with said one end of said coiled tubing, and a pump connected to said fluid coupling of said small diameter pipe and in fluid communication with said small diameter pipe via said fluid coupling, said fluid coupling providing said fluid communication between said pump and a first annular space disposed between the cable and the small diameter pipe, said fluid coupling providing said fluid communication between said first annular space and a second annular space disposed between the cable and the coiled tubing, said further coupling providing further fluid communication with said second annular space.

13. The wellbore apparatus of claim 12, wherein said cable comprises an electrical communication cable adapted to be disposed within said coiled tubing.

14. Apparatus adapted for use in connection with wellbore operations in a wellbore, comprising:

means for installing an electrical cable having a first diameter into one end of a coiled tubing, said coiled tubing being adapted to be disposed in said wellbore, the coiled tubing having a first internal diameter which is larger than the first diameter of the cable, the means for installing including, a seal through which the cable passes, a small diameter pipe attached to the seal having a second internal diameter which is at least larger than the first diameter of the cable and smaller than the first internal diameter of the coiled tubing, the small diameter pipe including a fluid coupling adapted for receiving a fluid from a pump, said fluid coupling providing said fluid from said pump to a first annular space disposed between the cable and the small diameter pipe and further providing said fluid from said first annular space to a second annular space disposed between the cable and the coiled tubing, an end of said coiled tubing adapted to be mechanically connected to a wellbore tool when said cable is installed into said coiled tubing by the means for installing, said cable in said coiled tubing adapted to be electrically connected to said wellbore tool when said cable is installed into said coiled robing by the means for installing.

15. The apparatus of claim 14, wherein said seal comprises a wireline lubricator connected to said pipe, said lubricator including a cable seal, said electrical cable adapted to be inserted into said cable seal, said cable seal lubricating said cable when said cable is inserted into said cable seal of said lubricator.

16. The apparatus of claim 14, wherein said wellbore tool is selected from the group consisting of: a logging tool adapted for logging said wellbore, a steering sensor, and a tool used in coiled tubing drilling operations in said wellbore.

* * * * *